March 9, 1926.

J. J. FARRELL 1,576,486

VALVE

Filed July 21, 1924

INVENTOR.
John J. Farrell.
BY
his ATTORNEYS.

Patented Mar. 9, 1926.

1,576,486

UNITED STATES PATENT OFFICE.

JOHN J. FARRELL, OF ROCHESTER, NEW YORK, ASSIGNOR TO MICHAELS, STERN & COMPANY, OF ROCHESTER, NEW YORK, A PARTNERSHIP COMPOSED OF JOSEPH MICHAELS, HENRY M. STERN, SAMUEL M. WEIL, HARRY F. LEITER, WALTER S. MEYERS, MORLEY A. STERN, MORRIS M. MEYERS, ISAAC STERN, MALCOLM W. GILLIS, AND JACQUE L. MEYERS, ALL OF ROCHESTER, NEW YORK.

VALVE.

Application filed July 21, 1924. Serial No. 727,116.

*To all whom it may concern:*

Be it known that I, JOHN J. FARRELL, a citizen of the United States, and resident of Rochester, in the county of Monroe and State of New York, have invented certain new and useful Improvements in Valves, of which the following is a specification.

The present invention relates to valves, and an object thereof is to provide a novel means of connecting a valve member to a valve stem in such a manner that wearing action on the valve seat is reduced to a minimum. A further object of the invention is to utilize a stem guide for a valve stem as a means for removably securing a packing washer to a valve member. Still another object of the invention is to provide a removable valve seat formed with a central opening acting as an inlet to the valve and a guide for the valve stem and the valve.

To these and other ends, the invention consists of certain parts and combinations of parts, all of which will be hereinafter described: the novel features being pointed out in the appended claims.

Figure 1:
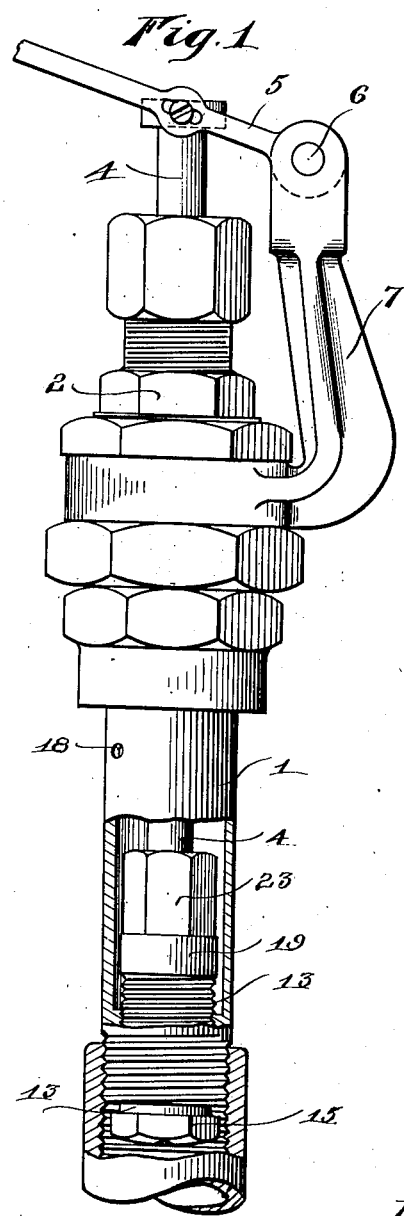
Fig. 1 is a side view of a valve constructed in accordance with this invention, with the valve casing partially broken away.
Figure 2:
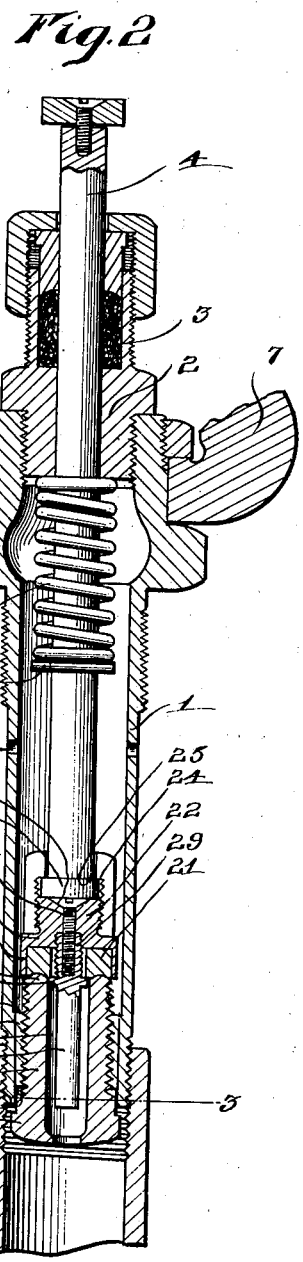
Fig. 2 is a longitudinal section through the valve.
Figure 3:
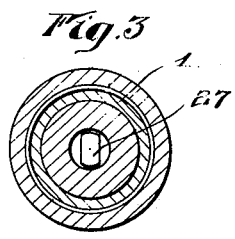
Fig. 3 is a section on the line 3—3, Fig. 2.

Referring more particularly to the illustrated embodiment of the invention, 1 indicates the valve casing which, in this instance, is in the form of a tube with a bushing 2 at one end carrying a packing 3. A stem 4 is longitudinally slidable in this bushing 2 and is operated in any suitable manner as by a lever 5 pivoted at 6 to the bracket 7 secured to the valve casing. A helical spring 8 may surround the stem and abut a pin 9—therein and also the bushing 2, holding the stem in a normal position with the valve closed. The valve casing has at its inner end an internally threaded sleeve 10 fixedly secured therein and providing at opposite ends shoulders 11 and 12. In this sleeve a bushing 13 is fitted, such bushing having a shoulder 14 for engaging the shoulder 12 and a polygonally shaped portion 15 with which a wrench or other tool may be engaged in order to cause the external threads on the bushing to turn on the internal threads of the sleeve 10. When the bushing is fitted in place its inner end 16 forms the valve seat. The bushing has, in this instance, a central bore or opening 17 serving as the inlet of the valve, the outlet being, in this instance, in the form of ports or openings 18 in the valve casing 1.

The valve member is carried by the valve stem and is, in this instance, movable thereon. In the illustrated embodiment of the invention the valve member 19 has on one side an annular flange 20 which forms a chamber for the reception of a packing 21, in this instance, in the form of an annular washer. From the opposite side of the valve member, an externally threaded projection 22 extends to cooperate with one end of the stem and be engaged by the internal threads of a collar 23, the collar having an internal shoulder 24 which engages an external shoulder 25 formed on the valve stem. It is thus apparent that the enlargement 26 on the end of the valve stem beyond the shoulder 25 is loosely held between the extension 22 and the internal shoulder 24 on the collar 23 so that the valve member is caused to move longitudinally with the valve stem and, at the same time, is adapted to rotate relatively thereto.

In order to prevent lateral movement of the free end of the valve and stem a stem guide 27 is provided. This guide, in this instance, substantially fits the walls of the bore 17 on two sides and has its other two sides flattened so as to provide passageway about the same for the fluid. This guide is secured to the valve member and may also perform the function of holding the packing 21 to the valve member. In this instance, the guide has an annular shoulder 28 which cooperates with a face of the valve packing 21. Beyond this shoulder this guide member has an extension 29 which is externally threaded and engages within an internally threaded bore in the valve member. To prevent the guide from being disconnected from the valve member, the latter is provided with a centrally arranged opening, the walls of which are screw threaded and the extension 27 is provided with a bore with screw threaded walls. A screw 30, which has its head counter-sunk at 31 in the extension 22 of the valve member, passes through the bore of the valve member and into the bore of the extension 29 of the guide member 27, thus holding the guide member against removal until the screw is removed.

It is apparent that the movement of the stem 4 against the action of the spring opens the valve, whereas release of the stem permits the valve to close under the action of the spring. The valve member is connected to the stem in such a manner that any turning movement of the stem is not transmitted to the valve member when the latter is in engagement with the seat and as a consequence, there is no wearing action on the valve member or its seat. Furthermore this movable connection permits the valve member 19 to adapt itself to the seat on the end of the bushing 13 and form a fluid tight joint with said seat. The packing for the valve member may be readily removed and another one substituted and it is held in place by a shoulder on the stem guide, the latter being removably secured to the valve member. The valve seat is formed on a removable bushing provided with a central orifice acting, in this instance, as an inlet to the valve.

The invention in the illustrated embodiment is designed for use in steam pressing machines, the tubular valve casing being threaded at its inner end into a suitable steam pipe and the outlets being in the side of the tubular valve casing and supplying steam to a steam chamber about the valve casing as is common in the art. It is apparent, however, that the invention is not limited to such use and that the features thereof may be employed in valves designed for other purposes.

What I claim as my invention and desire to secure by Letters Patent is:

1. A valve comprising a tubular casing having a packing gland at one end and internally and externally threaded at its opposite end, a valve stem guided longitudinally through the packing gland and having a valve member movably mounted on the inner end thereof, said valve member being provided with a removable packing, and an externally threaded bushing fitting the internal threads of the tubular casing and provided with a seat at its inner end for engagement by the packing of the valve member and having its outer end exposed at the end of the tubular casing for removal.

2. A valve comprising a tubular casing having internal and external threads near one end, a bushing having external threads engaging said internal threads, said bushing having a central opening and being formed with a valve seat at its inner end about the opening, the end of the bushing projecting beyond the end of the tubular casing to permit the ready removal of said bushing, a valve stem guided to slide longitudinally in the casing, a valve member carried by the stem to cooperate with the valve seat, and a guide member for the stem projecting from the valve member and guided in the opening of the bushing.

3. A valve comprising a stem, a valve member having a portion abutting one end of the stem, said valve member having a central opening and a counter-sunk portion about the opening adjacent the valve stem, means for securing the valve member to the stem, a guide for the stem, and a screw having its head received in the counter-sunk portion, extending through the central opening into the guide.

4. A valve comprising a valve stem having a shoulder near one end, a valve member having a screw threaded extension abutting said end of the stem and formed with a counter-sunk portion in said abutting portion and also with a central opening, a collar engaging the screw threaded extension of the valve member and formed with an internal shoulder engaging the shoulder on the stem, a packing ring carried by the valve member and having a central opening, a guide having a screw threaded extension passing through the central opening of the packing ring and engaging the valve member and having also an annular shoulder cooperating with the packing ring to hold the latter to the valve member, and a screw having its head received in the counter-sunk portion of the screw threaded extension of the valve member extending through the opening of the valve member into the screw threaded extension of the stem guide to hold the latter against movement.

JOHN J. FARRELL.